US012315405B2

(12) United States Patent
Jang et al.

(10) Patent No.: US 12,315,405 B2
(45) Date of Patent: May 27, 2025

(54) DISPLAY APPARATUS AND OVERCURRENT DETECTION METHOD THEREOF

(71) Applicant: LG Display Co., Ltd., Seoul (KR)

(72) Inventors: Won Yong Jang, Paju-si (KR); Soon Dong Cho, Paju-si (KR); Hoon Jang, Paju-si (KR); Jung Jae Kim, Paju-si (KR); Dong Ju Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 133 days.

(21) Appl. No.: 17/961,551

(22) Filed: Oct. 6, 2022

(65) Prior Publication Data

US 2023/0196955 A1 Jun. 22, 2023

(30) Foreign Application Priority Data

Dec. 21, 2021 (KR) ........................ 10-2021-0183729

(51) Int. Cl.
*G09G 3/00* (2006.01)

(52) U.S. Cl.
CPC ..... *G09G 3/006* (2013.01); *G09G 2310/0286* (2013.01); *G09G 2310/08* (2013.01); *G09G 2330/028* (2013.01); *G09G 2330/12* (2013.01)

(58) Field of Classification Search
None
See application file for complete search history.

(56) References Cited

U.S. PATENT DOCUMENTS 10,290,246 B2 5/2019 Lee et al.
2017/0316728 A1* 11/2017 Lee ...................... G09G 3/3677
2021/0142714 A1* 5/2021 Sung .................... G09G 3/3696
2021/0248939 A1* 8/2021 Ahn ...................... G09G 3/2092
2021/0280136 A1* 9/2021 Shin ...................... G09G 3/3266
2022/0068179 A1* 3/2022 Jang ...................... G09G 3/2096
2023/0018128 A1* 1/2023 Byeon ...................... G09G 5/18
2023/0058571 A1* 2/2023 Byeon .................. G09G 3/3674

FOREIGN PATENT DOCUMENTS

KR 10-2017-0122891 A 11/2017

OTHER PUBLICATIONS

Korean Intellectual Property Office, Office Action, Korean Patent Application No. 10-2021-0183729, Feb. 5, 2025, nine pages.

* cited by examiner

*Primary Examiner* — Andre L Matthews
(74) *Attorney, Agent, or Firm* — Fenwick & West LLP

(57) ABSTRACT

A display apparatus includes a display panel driven based on a first gate clock and a second gate clock, a clock supply circuit including a first output terminal for an output of the first gate clock and a second output terminal for an output of the second gate clock, supplying the first output terminal with one of a gate high voltage and a gate low voltage as a first test voltage, and supplying the second output terminal with the other of the gate high voltage and the gate low voltage as a second test voltage, for a first time immediately after a system power is applied thereto, a power generator generating the gate high voltage and the gate low voltage and supplying the gate high voltage and the gate low voltage to the clock supply circuit, and an overcurrent detector receiving a flag signal to recognize overcurrent from the power generator to shut down the power generator, when the first output terminal and the second output terminal are short-circuited with each other at the first time interval.

15 Claims, 13 Drawing Sheets

DISPLAY APPARATUS AND OVERCURRENT DETECTION METHOD THEREOF

CROSS-REFERENCE TO RELATED APPLICATIONS

This application claims the benefit of the Korean Patent Application No. 10-2021-0183729 filed on Dec. 21, 2021, which is hereby incorporated by reference as if fully set forth herein.

BACKGROUND

Field of the Invention

The present disclosure relates to a display apparatus and an overcurrent detection method thereof.

Discussion of the Related Art

When an overcurrent occurs in a display apparatus, the operation stability of the display apparatus is reduced. The overcurrent may occur due to various causes such as a short circuit defect between lines for supplying a driving signal to a display panel.

In display apparatuses of the related art, because an overcurrent is detected in display driving for displaying an input image, there is a problem where the accuracy of detection is reduced because a time for detecting the overcurrent is short in a display apparatus which is driven at a high speed or has a high resolution.

SUMMARY

To overcome the aforementioned problem of the related art, the present disclosure may provide a display apparatus and an overcurrent detection method thereof, in which a long time for detecting an overcurrent is secured to increase the accuracy of overcurrent detection.

To achieve these objects and other advantages and in accordance with the purpose of the disclosure, as embodied and broadly described herein, a display apparatus includes a display panel driven based on a first gate clock and a second gate clock, a clock supply circuit including a first output terminal for an output of the first gate clock and a second output terminal for an output of the second gate clock, supplying the first output terminal with one of a gate high voltage and a gate low voltage as a first test voltage, and supplying the second output terminal with the other of the gate high voltage and the gate low voltage as a second test voltage, for a first time immediately after a system power is applied thereto, a power generator generating the gate high voltage and the gate low voltage and supplying the gate high voltage and the gate low voltage to the clock supply circuit, and an overcurrent detector receiving a flag signal to recognize an overcurrent from the power generator to shut down the power generator, when the first output terminal and the second output terminal are short-circuited with each other at the first time.

In another aspect of the present disclosure, an overcurrent detection method of a display apparatus includes generating a gate high voltage and a gate low voltage by using a power generator, supplying one of the gate high voltage and the gate low voltage as a first test voltage to a first output terminal for an output of a first gate clock by using a clock supply circuit, for a first time immediately after a system power is applied, supplying the other of the gate high voltage and the gate low voltage as a second test voltage to a second output terminal for an output of a second gate clock by using the clock supply circuit, for the first time interval, and when the first output terminal and the second output terminal are short-circuited with each other at the first time interval, receiving a flag signal to recognize an overcurrent from the power generator to shut down the power generator by using an overcurrent detector.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

A display apparatus according to the present embodiment may be implemented as a television (TV), a video player, a personal computer (PC), a home theater, a vehicle electrical apparatus, or a smartphone, but is no limited thereto. The display apparatus according to the present embodiment may be implemented as a light emitting display apparatus, a quantum dot display (QDD) apparatus, or a liquid crystal display (LCD) apparatus. Hereinafter, however, for convenience of description, a light emitting display apparatus based on an inorganic light emitting diode or an organic light emitting diode will be described for example.

Moreover, a light emitting display apparatus described below will be described as including an n-type or p-type transistor for example, but is not limited thereto and may be implemented as a type where the n type and the p type are provided in common. A transistor may be a three-electrode element which includes a gate, a source, and a drain. The source and the drain of the transistor may switch therebetween based on a voltage applied thereto. Based thereon, in the following description, one of a source and a drain will be described as a first electrode, and the other of the source and the drain will be described as a second electrode.

Figure 1:
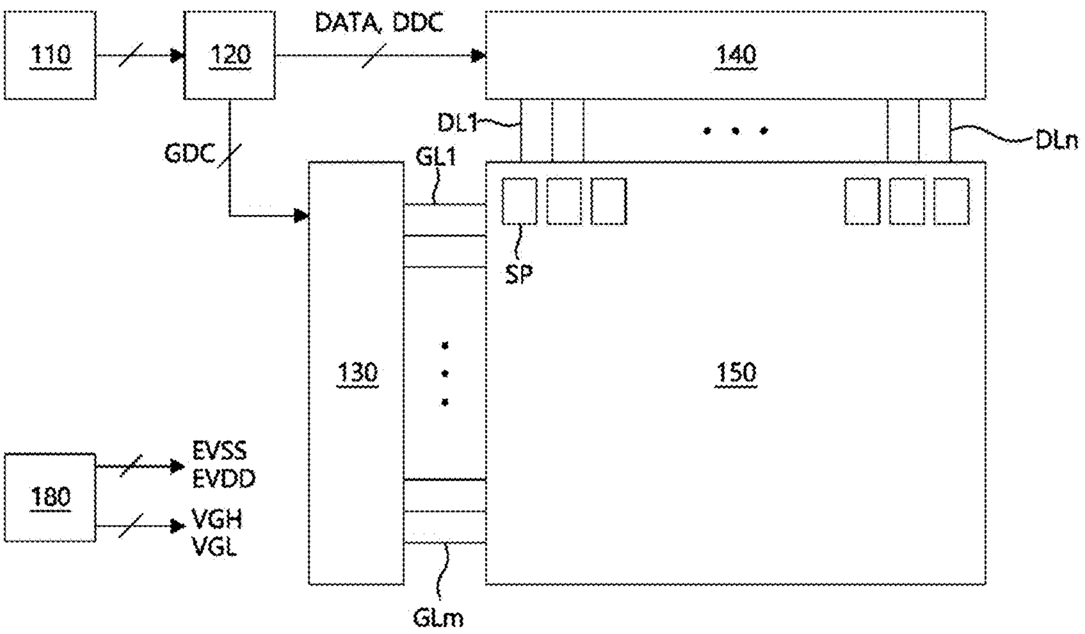
FIG. 1 is a diagram illustrating a display apparatus according to an embodiment of the present disclosure.
Figure 2:
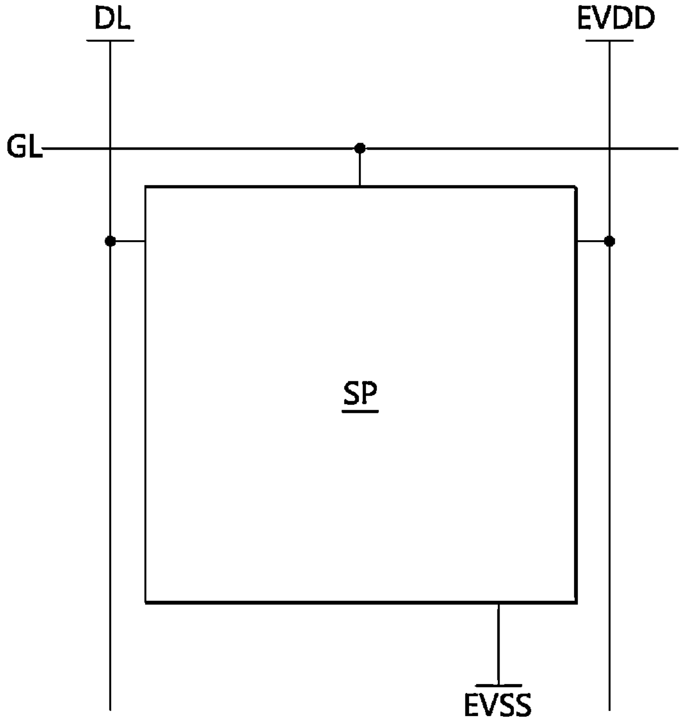
FIG. 2 is a diagram schematically illustrating a subpixel illustrated in FIG. 1.

FIG. 1 is a diagram illustrating a display apparatus according to an embodiment of the present disclosure. FIG. 2 is a diagram schematically illustrating a subpixel illustrated in FIG. 1.

As illustrated in FIGS. 1 and 2, the display apparatus according to the present embodiment may include a host system 110, a timing controller 120, a scan driver 130, a data driver 140, a display panel 150, and a power circuit 180. Based on an implementation type of a display apparatus, one or more of the timing controller 120, the scan driver 130, and the data driver 140 may be integrated into a single integrated circuit (IC).

The host system 110 may output various timing signals along with video data supplied from the outside or video data stored in an internal memory. The host system 110 may supply the video data and the timing signal to the timing controller 120.

The timing controller 120 may output a gate timing control signal GDC for controlling an operation timing of the scan driver 130 and a data timing control signal DDC for controlling an operation timing of the data driver 140, based on the timing signal. The timing controller 120 may supply image data DATA to the data driver 140 along with the data timing control signal DDC. The timing controller 120 may be implemented as an IC type and may be mounted on a printed circuit board (PCB), but is not limited thereto.

The scan driver 130 may output a scan signal, based on a gate timing control signal GDC supplied from the timing controller 120. The scan driver 130 may supply the scan signal to subpixels included in the display panel 150 through gate lines GL1 to GLm. The scan driver 130 may be implemented as an IC type or may be directly provided on the display panel 150 in a gate in panel (GIP) type, but is not limited thereto.

The data driver 140 may sample and latch the image data DATA on the basis of the data timing control signal DDC supplied from the timing controller 120 and may map the latched data to a gamma compensation voltage to generate an analog data voltage. The data driver 140 may supply data voltages to the subpixels included in the display panel 150 through data lines DL1 to DLn. The data driver 140 may be implemented as an IC type and may be mounted on the display panel 150 or a PCB, but is not limited thereto.

The power circuit 180 may generate a first panel power EVDD having a high level and a second panel power EVSS having a low level, based on a direct current (DC) input voltage supplied from the outside. The power circuit 180 may further generate a gate high voltage VGH and a gate low voltage VGL, needed for driving of the scan driver 130, and a source voltage needed for driving of the data driver 140.

The display panel 150 may be supplied with the scan signal, a driving signal including a data voltage, the first panel power EVDD, and the second panel power EVSS to display an input image. Each of the subpixels of the display panel 150 may directly emit light. The display panel 150 may be manufactured based on a substrate such as glass, silicone, or polyimide having stiffness or ductility. Red, green, and blue subpixels may configure one pixel, or red, green, blue, and white subpixels may configure one pixel. In addition, a method where a plurality of subpixels configure one pixel may be variously modified. A subpixel SP may include a pixel circuit including a switching transistor, a driving transistor, a storage capacitor, and a light emitting diode.

Figure 3:
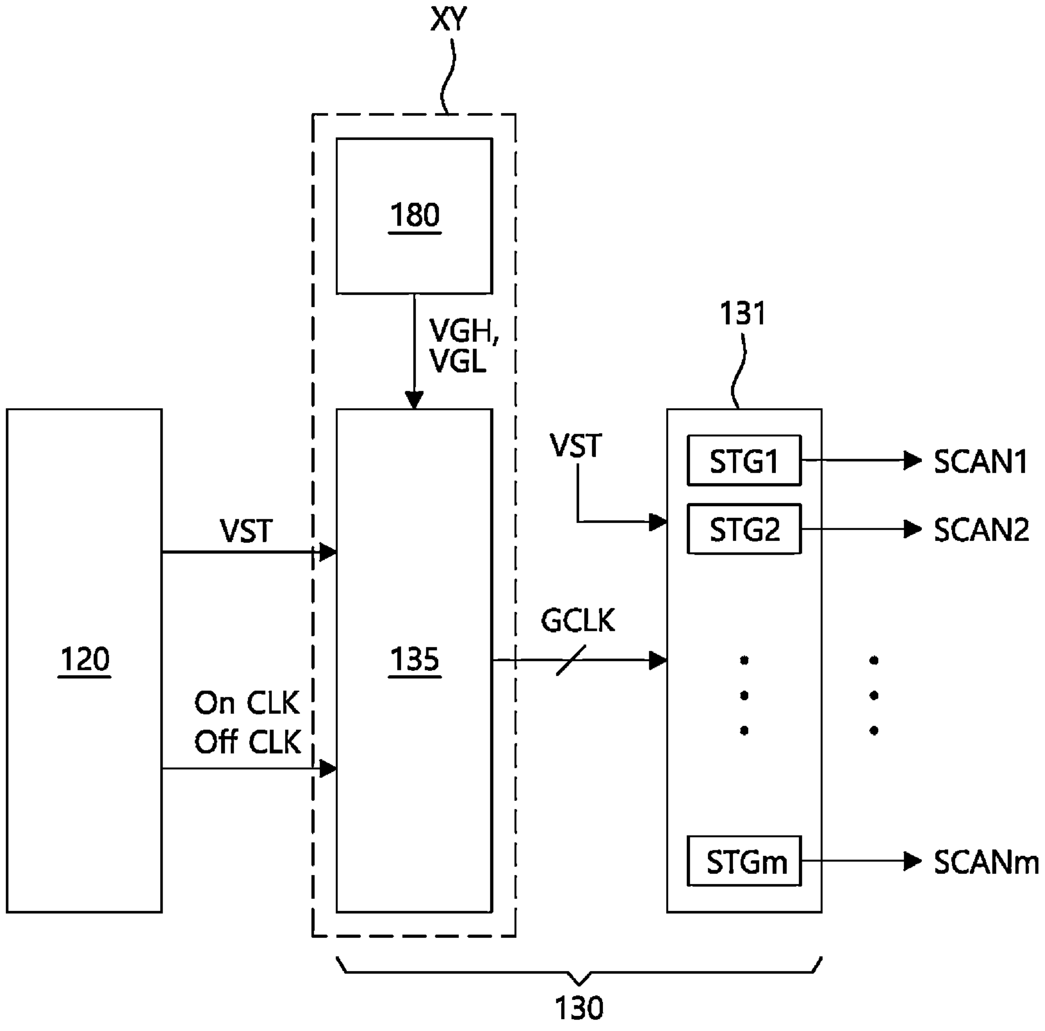
FIG. 3 is a diagram schematically illustrating an overall circuit configuration including a safety circuit according to an embodiment of the present disclosure.

FIG. 3 is a diagram schematically illustrating an overall circuit configuration including a safety circuit according to an embodiment of the present disclosure.

Referring to FIG. 3, a scan driver 130 may include a level shifter 135 and a gate shift register 131.

The level shifter 135 may generate gate clocks GCLK on the basis of the gate timing control signal GDC (for example, a start signal VST, an on clock (On CLK), and an off clock (Off CLK)) and the gate high voltage VGH and the gate low voltage VGL input from the power circuit 180. The gate clocks GCLK may have different phases and may be supplied to the gate shift register 131 through different clock lines.

The gate shift register 131 may receive the gate clocks GCLK from the level shifter 135 through a plurality of clock lines. The gate shift register 131 may receive the start signal VST from the timing controller 120 through a start line.

The gate shift register 131 may include a plurality of gate stages STG1 to STGm which are connected to one another in cascade and may generate scan signals SCAN1 to SCANm, based on the gate clocks GCLK and the start signal VST. Output terminals of the scan signals SCAN1 to SCANm may be connected to gate lines of a display panel and may supply the scan signals SCAN1 to SCANm to the gate lines.

In the present embodiment, a safety circuit XY may include the level shifter 135 and the power circuit 180.

The safety circuit XY may detect a short circuit defect between output terminals of the level shifter 135 connected to clock lines. A short circuit defect between output terminals included in the level shifter 135 may occur due to various causes such as a defect of an IC, short circuit caused by particles occurring in a manufacturing process, short circuit caused by a panel crack occurring in an assembly process, and short circuit occurring in packaging of an apparatus, movement, or an installation process.

When a short circuit defect occurs between output terminals included in the level shifter 135, overcurrent may flow in the power circuit 180. The power circuit 180 may generate a flag signal whenever overcurrent is detected, and when the flag signal is repeatedly generated for a certain time, the power circuit 180 may be shut down, thereby preventing an abnormal operation of an apparatus and securing the stability of an operation.

Figure 4:
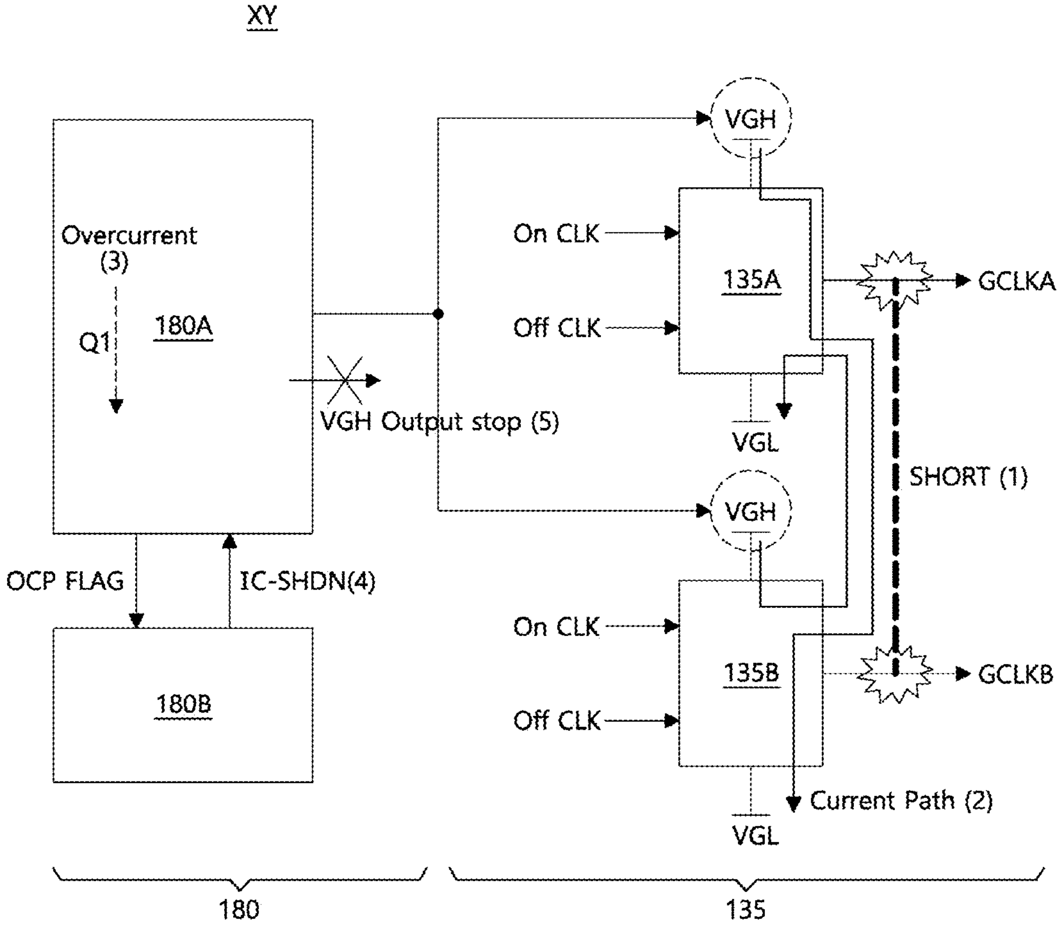
FIG. 4 is a diagram illustrating a schematic configuration of a safety circuit according to a comparative example of the present disclosure.
Figure 5:
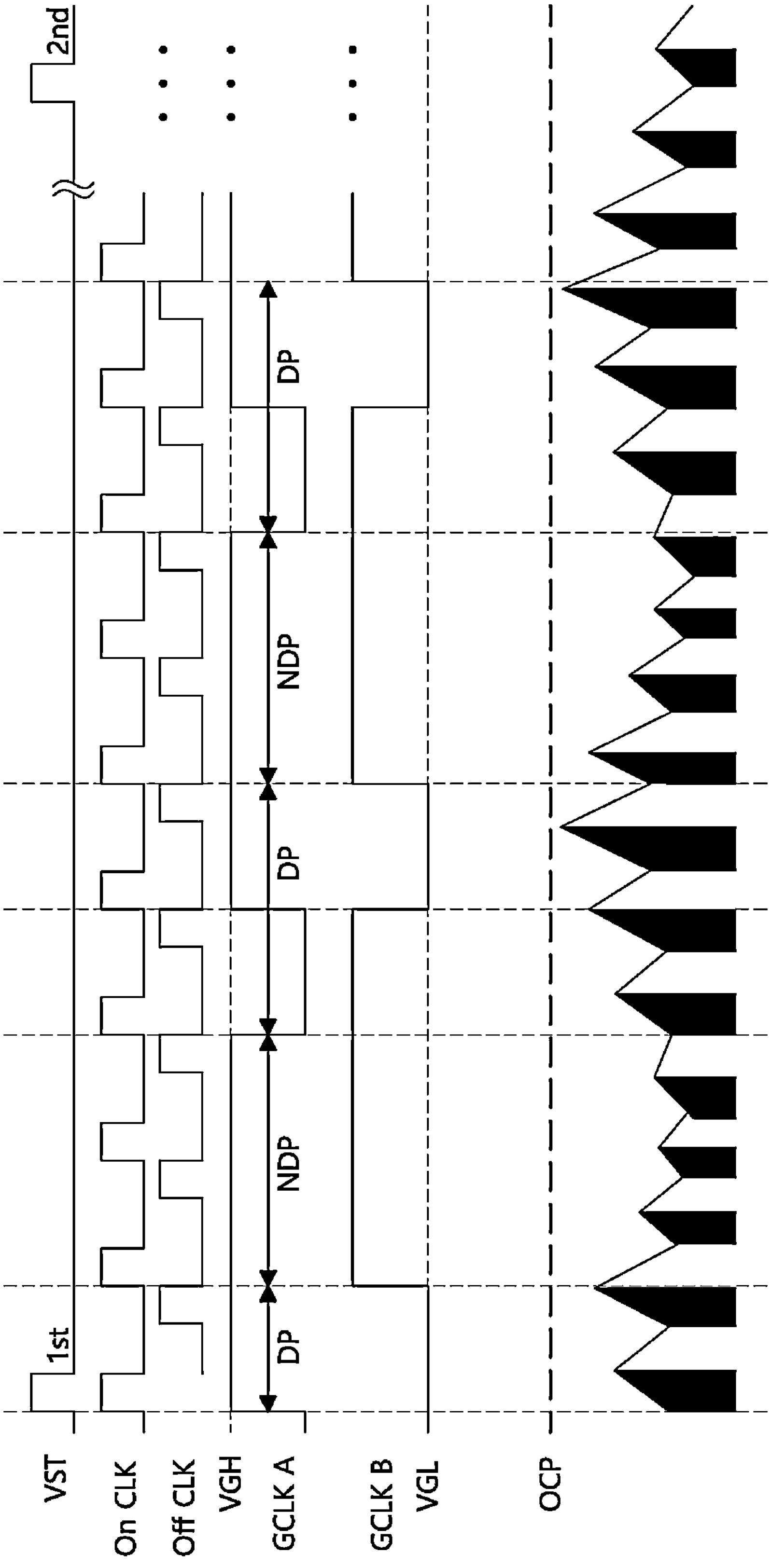
FIG. 5 is a diagram illustrating a driving waveform of the safety circuit of FIG. 4.

FIG. 4 is a diagram illustrating a schematic configuration of a safety circuit XY according to a comparative example of the present disclosure. FIG. 5 is a diagram illustrating a driving waveform of the safety circuit of FIG. 4.

Referring to FIG. 4, in the safety circuit XY according to the comparative example, a level shifter 135 may include a first pulse generator 135A and a second pulse generator 135B, and a power circuit 180 may include a power generator 180A and an overcurrent detector 180B.

The first pulse generator 135A may generate a first pulse, based on an on clock and an off clock input from the timing controller 120. The first pulse may be a first gate clock GCLKA which is shifted to a first phase while swinging between a gate high voltage VGH and a gate low voltage VGL. A rising edge of the first gate clock GCLKA may be synchronized with a rising edge of the on clock, and a falling edge of the first gate clock GCLKA may be synchronized with a falling edge of the off clock. The first gate clock GCLKA may be supplied to a first clock line through a first output terminal.

The second pulse generator 135B may generate a second pulse, based on the on clock and the off clock input from the timing controller 120. The second pulse may be a second gate clock GCLKB which is shifted to a second phase while swinging between the gate high voltage VGH and the gate low voltage VGL. A rising edge of the second gate clock GCLKB may be synchronized with a rising edge of the on clock, and a falling edge of the second gate clock GCLKB may be synchronized with a falling edge of the off clock. The second gate clock GCLKB may be supplied to a second clock line through a second output terminal.

The power generator 180A may include a boost converter which includes a transistor Q1 and a flag signal generator which detects overcurrent flowing in the transistor Q1 to generate an overcurrent protection (OCP) flag signal. The boost converter may boost an input DC voltage in cooperation with a pulse width modulation (PWM) operation of the transistor Q1, and thus, may generate the gate high voltage VGH. When a drain voltage of the transistor Q1 is greater than a reference value, the flag signal generator may generate the OCP flag signal and may supply the OCP flag signal to the overcurrent detector 180B.

The overcurrent detector 180B may shut down the power generator 180A according to the OCP flag signal.

An overcurrent detection operation and a subsequent processing operation of the safety circuit XY will be briefly described below.

When a first output terminal of the first pulse generator 135A is short-circuited with a second output terminal of the second pulse generator 135B due to a defect ((1) process), a defective current path from a gate high voltage VGH terminal of the first pulse generator 135A to a gate low voltage VGL terminal of the second pulse generator 135B may occur, or a defective current path from a gate high voltage VGH terminal of the second pulse generator 135B to a gate low voltage VGL terminal of the first pulse generator 135A may occur ((2) process). Due to such a defective current path, overcurrent may flow in the transistor Q1 of the power generator 180A and the OCP flag signal may be generated ((3) process).

When the OCP flag signal is repeatedly input for a certain time, the overcurrent detector 180B may shut down the power generator 180A ((4) process) and may stop an output of the gate high voltage VGH from the power generator 180A ((5) process).

In the safety circuit XY according to the comparative example described above, an overcurrent detection operation may be performed in display driving for displaying an input image. However, because the first gate clock GCLKA and the second gate clock GCLKB are output with a phase difference of a one on clock period (or a one off clock period) in display driving as in FIG. 5, a time for which a defective current path is formed due to short circuit between the first and second output terminals may not be maintained to be long and may be short. In FIG. 5, "DP" may represent a period where a defective current path is formed when short circuit occurs between the first and second output terminals, and "NDP" may represent a period where a defective current path is not formed despite short circuit occurring between the first and second output terminals.

As illustrated in FIG. 5, a period where a defective current path is formed when short circuit occurs between first and second output terminals may be a period where one of the first gate clock GCLKA and the second gate clock GCLKB is the gate high voltage VGH and the other is the gate low voltage VGL. When all of the first gate clock GCLKA and the second gate clock GCLKB are the same gate high voltage VGH, a defective path between the gate high voltage VGH and the gate low voltage VGL may not occur despite the occurrence of the short circuit.

In FIG. 5, "DP" may be very short by a one on clock period. The OCP flag signal may be generated when a current flowing in the transistor Q1 is higher than an OCP level. However, when a time for which a defective current path is formed due to short circuit is short, a Q1 current flowing in the transistor Q1 may be difficult to reach the OCP level. Referring to FIG. 5, the Q1 current may increase in "DP" and may decrease in "NDP", and because "DP" is not sufficiently long to a degree to which the Q1 current reaches the OCP level, the Q1 current may not reach the OCP level and may decrease again.

As described above, in the safety circuit XY according to the comparative example described above, because it is difficult to detect overcurrent caused by short circuit, a follow-up action such as shutdown may be late, and due to this, the stability of an apparatus may be reduced.

Figure 6:
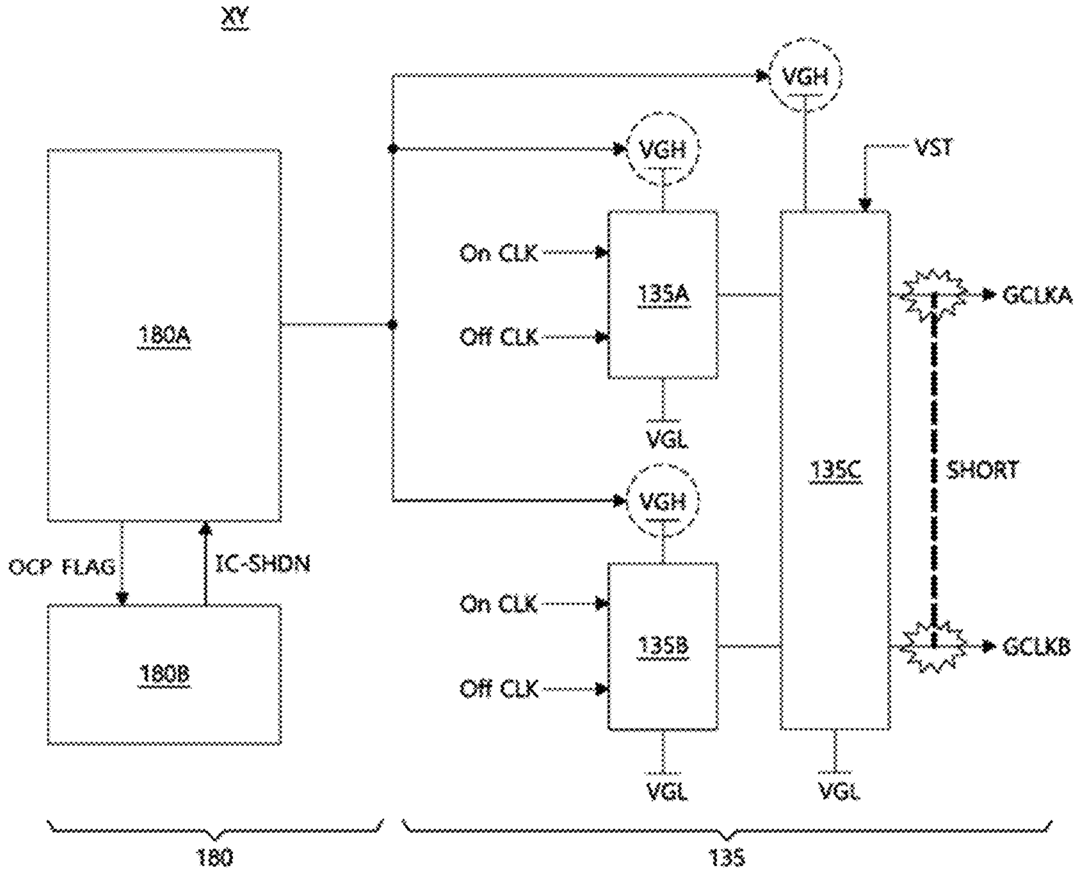
FIG. 6 is a diagram illustrating a schematic configuration of a safety circuit according to an embodiment of the present disclosure.

FIG. 6 is a diagram illustrating a schematic configuration of a safety circuit XY according to an embodiment of the present disclosure.

Referring to FIG. 6, the safety circuit XY according to an embodiment may further include a clock supply circuit 135C which is not provided in the comparative example of FIG. 4, and thus, a long time for detecting overcurrent may be secured. In the embodiment of FIG. 6, unlike the comparative example of FIG. 4, in detecting overcurrent for a first time interval before display driving, the first time interval may be between a first pulse and a second pulse of a start signal VST counted from a timing at which a system power is applied. Display driving may start from the second pulse of the start signal VST.

The clock supply circuit 135C may include a first output terminal for an output of the first gate clock GCLKA and a second output terminal for an output of the second gate clock GCLKB. For a first time interval immediately after the system power is applied, the clock supply circuit 135C may supply the first output terminal with one of the gate high voltage VGH and the gate low voltage VGL as a first test voltage and may supply the second output terminal with the other of the gate high voltage VGH and the gate low voltage VGL as a second test voltage, and thus, a period where a defective current path is formed when the first output terminal is short-circuited with the second output terminal may increase to the first time interval. The first time interval may be longer than a first clock period of the first gate clock GCLKA or the second gate clock GCLKB, and thus, a period for detecting overcurrent caused by the short circuit in the power circuit 180 may increase compared to the comparative example of FIG. 4.

Figure 7:
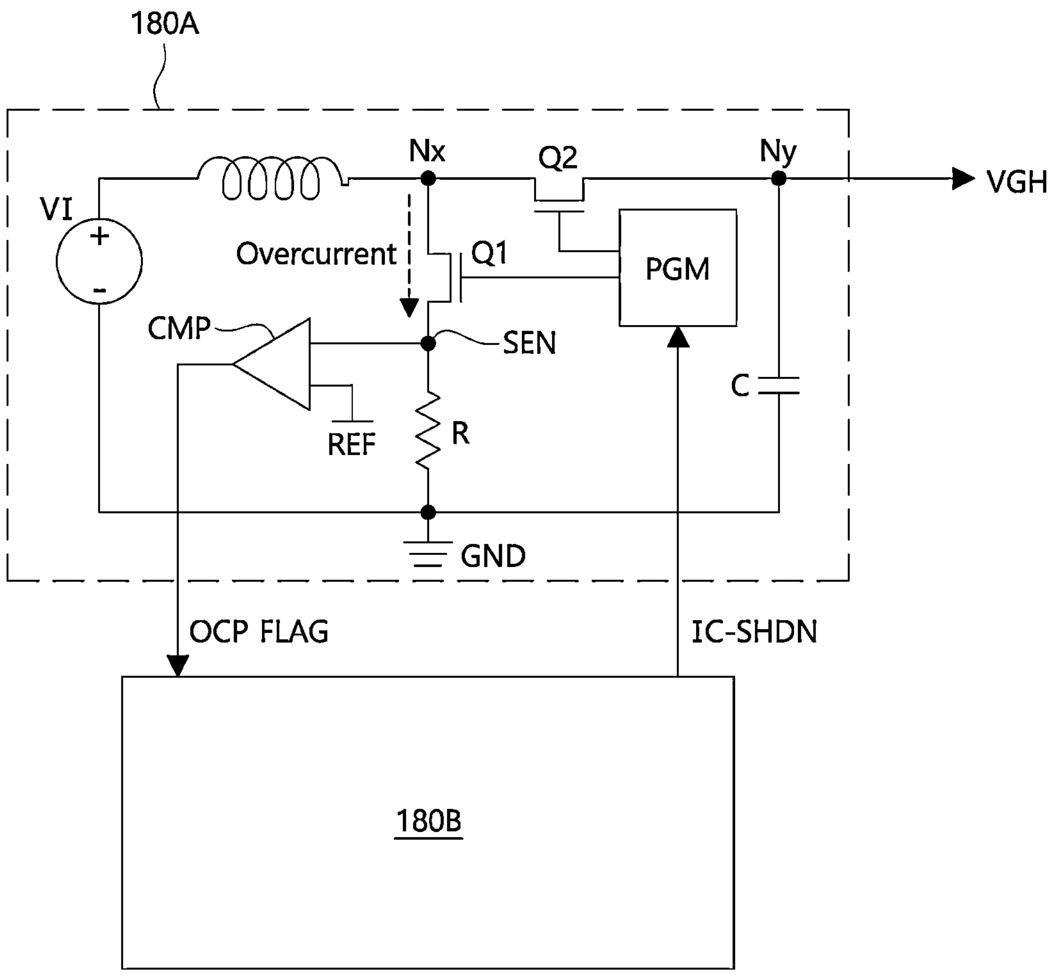
FIG. 7 is a diagram illustrating a detailed configuration of a power circuit included in the safety circuit of FIG. 6.

FIG. 7 is a diagram illustrating a detailed configuration of the power circuit 180 included in the safety circuit XY of FIG. 6.

Referring to FIG. 7, the power circuit 180 may include a power generator 180A and an overcurrent detector 180B.

The power generator 180A may boost an input DC voltage VI of a DC power source to generate the gate high voltage VGH, and when the first output terminal and the second output terminal of the clock supply circuit 135C are short-circuited with each other, the power generator 180A may detect overcurrent flowing in a transistor Q1 for the first time interval to generate the OCP flag signal. The power generator 180A may include a boosting circuit which generates the gate high voltage VGH and a flag signal generator CMP which generates the OCP flag signal.

The boosting circuit of the power generator 180A may include an inductor L which is connected between the DC power source and a node Nx, the transistor Q1 which is connected between the node Nx and a node SEN and is alternately turned on or off based on a PWM control signal, a transistor Q2 which is connected between the node Nx and a node Ny and maintains an on state on the basis of an on control signal, a switch controller PGM which generates the PWM control signal and the on control signal to control operations of the transistors Q1 and Q2, a resistor R which is connected between the node SEN and a ground power source GND, and a capacitor C which is connected between the node Ny and the ground power source GND. The transistor Q2 may maintain an on state and the transistor Q1 may be repeatedly turned on or off a plurality of times according to the PWM control signal, and thus, the input DC voltage VI may be boosted to the gate high voltage VGH.

The flag signal generator CMP of the power generator 180A may compare a voltage of the node SEN with a predetermined OCP level, and whenever the voltage of the node SEN is higher than the OCP level, the flag signal generator CMP may generate the OCP flag signal. Overcurrent may flow in the transistor Q1 when the first output terminal and the second output terminal of the clock supply circuit 135C are short-circuited with each other for the first time interval, and because the voltage of the node SEN is higher than the OCP level when overcurrent flows in the transistor Q1, the OCP flag signal may be generated.

When the first output terminal and the second output terminal of the clock supply circuit 135C are short-circuited with each other at the first time interval, the overcurrent detector 180B may receive the OCP flag signal from the power generator 180A to shut down the switch controller PGM of the power generator 180A. When the switch controller PGM is shut down, an output of the gate high voltage VGH from the power generator 180A may stop.

The overcurrent detector 180B may be implemented as a logic circuit. In order to increase the stability and reliability of an operation of the overcurrent detector 180B, when the OCP flag signal is continuously input first times in the first time interval, the overcurrent detector 180B may self-restart, and then the power generator 180A may be shut down after the restart operation is repeated second times. The first times may be greater than the second times. In the present embodiment, the first times may be 64 times and the second times may be three times, but the inventive concept is not limited thereto.

Figure 8:
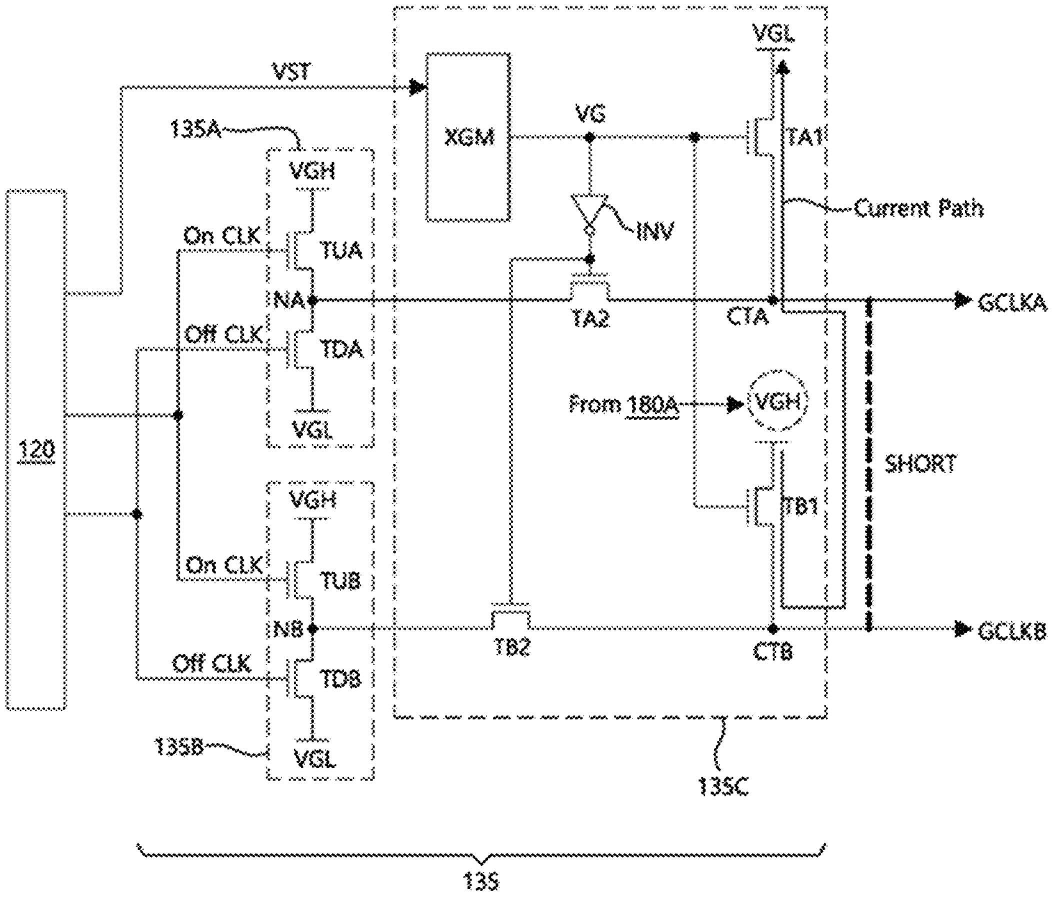
FIG. 8 is a diagram illustrating a circuit configuration of a level shifter included in the safety circuit of FIG. 6.

FIG. 8 is a diagram illustrating a circuit configuration of the level shifter 135 included in the safety circuit XY of FIG. 6.

Referring to FIG. 8, a level shifter 135 may include a first pulse generator 135A, a second pulse generator 135B, and a clock supply circuit 135C.

The first pulse generator 135A may generate a first pulse, based on an on clock and an off clock input from the timing controller 120. The first pulse may be a first gate clock GCLKA which is shifted to a first phase while swinging between a gate high voltage VGH and a gate low voltage VGL. A rising edge of the first gate clock GCLKA may be synchronized with a rising edge of the on clock, and a falling edge of the first gate clock GCLKA may be synchronized with a falling edge of the off clock (see FIG. 10). The first gate clock GCLKA may be supplied to a first clock line through a first output terminal.

The first pulse generator 135A may include a first pull-up transistor TUA, which is connected between an input terminal for the gate high voltage VGH and a node NA and is turned on or off based on an on clock, and a first pull-down transistor TDA which is connected between the node NA and an input terminal for the gate low voltage VGL and is turned on or off based on an off clock. When the first pull-up transistor TUA is turned on, the first pulse generator 135A may output the first pulse as the gate high voltage VGH, and when the first pull-down transistor TDA is turned on, the first pulse generator 135A may output the first pulse as the gate low voltage VGL.

The second pulse generator 135B may generate a second pulse, based on the on clock and the off clock input from the timing controller 120. The second pulse may be a second gate clock GCLKB which is shifted to a second phase while swinging between the gate high voltage VGH and the gate low voltage VGL. A rising edge of the second gate clock GCLKB may be synchronized with a rising edge of the on clock, and a falling edge of the second gate clock GCLKB may be synchronized with a falling edge of the off clock (see FIG. 10). The second gate clock GCLKB may be supplied to a second clock line through a second output terminal.

The second pulse generator 135B may include a second pull-up transistor TUB, which is connected between the input terminal for the gate high voltage VGH and a node NB and is turned on or off based on the on clock, and a second pull-down transistor TDB which is connected between the node NB and the input terminal for the gate low voltage VGL and is turned on or off based on the off clock. When the second pull-up transistor TUB is turned on, the second pulse generator 135B may output the second pulse as the gate high voltage VGH, and when the second pull-down transistor TDB is turned on, the second pulse generator 135B may output the second pulse as the gate low voltage VGL.

The clock supply circuit 135C may include a first output terminal CTA for an output of the first gate clock GCLKA and a second output terminal CTB for an output of the second gate clock GCLKB. For a first time interval immediately after the system power is applied, the clock supply circuit 135C may supply the first output terminal CTA with one of the gate high voltage VGH and the gate low voltage VGL as a first test voltage (for example, VGL of FIGS. 9 and 10) and may supply the second output terminal CTB with the other of the gate high voltage VGH and the gate low voltage VGL as a second test voltage (for example, VGH of FIGS. 9 and 10), and thus, a period where a defective current path is formed when the first output terminal CTA is short-circuited with the second output terminal CTB may increase to the first time interval (see FT1 of FIGS. 9 and 10).

To this end, for the first time interval, the clock supply circuit 135C may break an electrical connection between the node NA and the first output terminal CTA and may break an electrical connection between the node NB and the second output terminal CTB. Also, the clock supply circuit 135C may connect the node NA to the first output terminal CTA at a second time interval (see FT2 of FIGS. 9 and 10) and may connect the node NB to the second output terminal CTB at the second time interval.

The clock supply circuit 135C may include a control voltage output circuit XGM, a first control transistor TA1, a second control transistor TB1, an inverter INV, a third control transistor TA2, and a fourth control transistor TB2.

The control voltage output circuit XGM may output a gate control voltage VG having an on level for the first time interval on the basis of a start signal VST for defining a one frame time and may output the gate control voltage VG having an off level for the second time interval succeeding the first time interval.

The first control transistor TA1 may be connected between the first output terminal CTA and the input terminal for the gate low voltage VGL and may be turned on or off based on the gate control voltage VG. The first control transistor TA1 may be turned on for the first time interval based on the gate control voltage VG having an on level to supply the first test voltage VGL to the first output terminal CTA and may maintain a turn-off state for the second time interval based on the gate control voltage VG having an off level.

The second control transistor TB1 may be connected between the second output terminal CTB and the input terminal for the gate high voltage VGH and may be turned on or off based on the gate control voltage VG. The second control transistor TB1 may be turned on for the first time interval based on the gate control voltage VG having an on level to supply the second test voltage VGH to the second output terminal CTB and may maintain a turn-off state for the second time interval based on the gate control voltage VG having an off level.

The inverter INV may invert the gate control voltage VG having an on level to the gate control voltage VG having an off level for the first time interval and may invert the gate control voltage VG having an off level to the gate control voltage VG having an on level for the second time interval.

The third control transistor TA2 may be connected between the node NA and the first output terminal CTA and may be turned on or off based on an output of the inverter INV. The third control transistor TA2 may be turned off for the first time interval based on the inverted gate control voltage VG having an off level to break an electrical connection between the node NA and the first output terminal CTA, and moreover, may be turned on for the second time interval based on the inverted gate control voltage VG having an on level to electrically connect the node NA to the first output terminal CTA.

The fourth control transistor TB2 may be connected between the node NB and the second output terminal CTB and may be turned on or off based on the output of the inverter INV. The fourth control transistor TB2 may be turned off for the first time interval based on the inverted gate control voltage VG having an off level to break an electrical connection between the node NB and the second output terminal CTB, and moreover, may be turned on for the second time interval based on the inverted gate control voltage VG having an on level to electrically connect the node NB to the second output terminal CTB.

Figure 9:
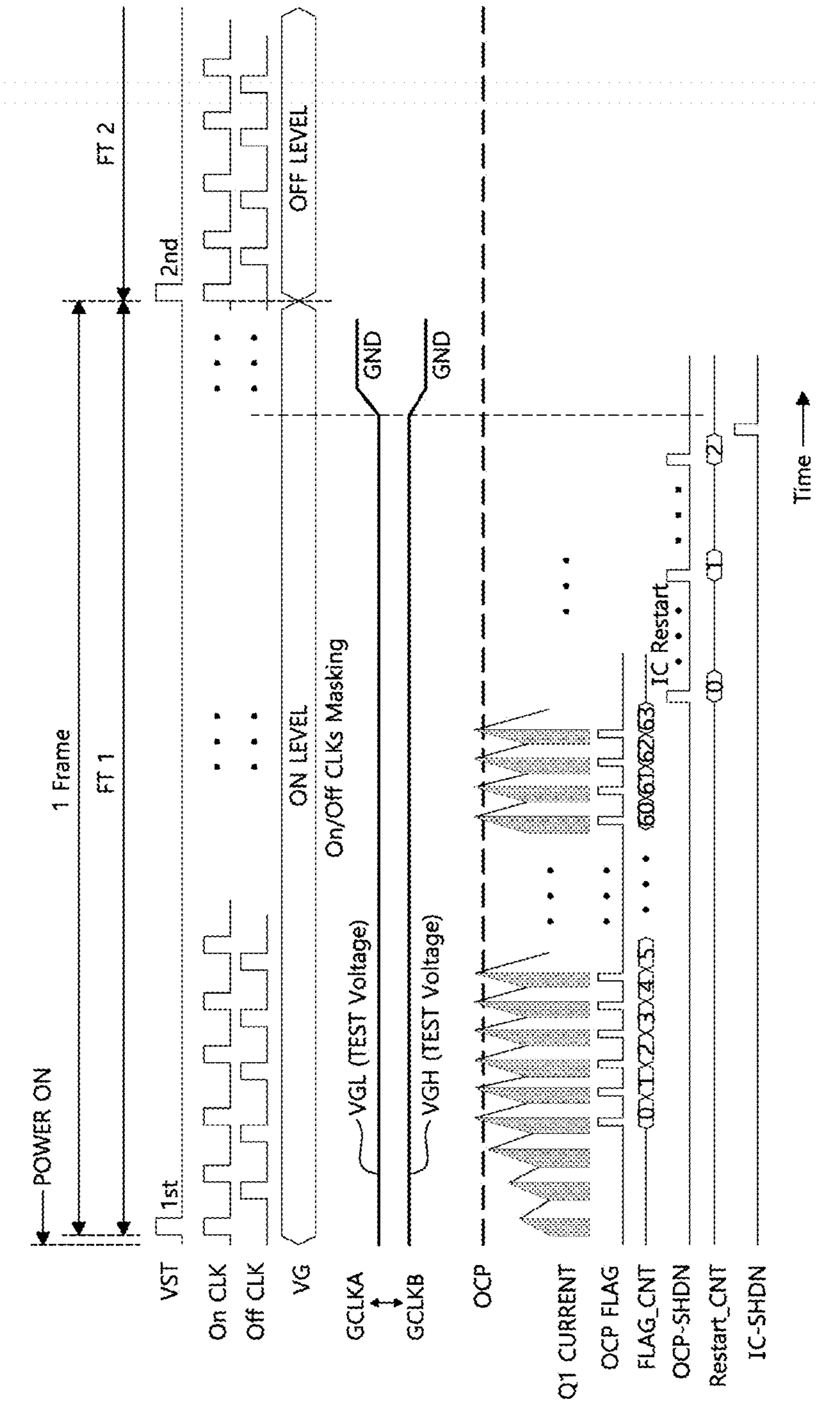
FIG. 9 is a diagram illustrating a driving waveform of the safety circuit of FIGS. 7 and 8 under an overcurrent occurrence condition.
Figure 10:
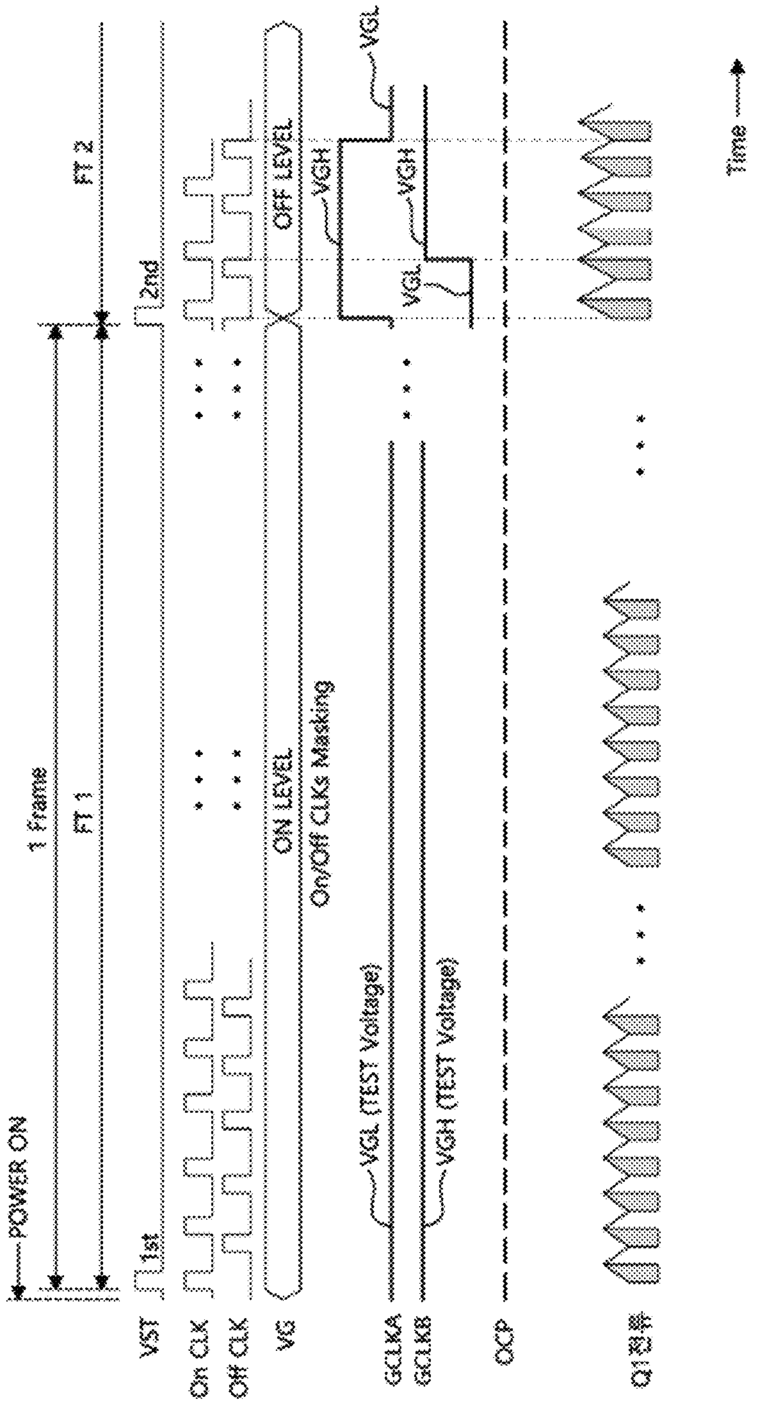
FIG. 10 is a diagram illustrating a driving waveform of the safety circuit of FIGS. 7 and 8 under an overcurrent nonoccurrence condition.

FIG. 9 is a diagram illustrating a driving waveform of the safety circuit XY of FIGS. 7 and 8 under an overcurrent occurrence condition. FIG. 10 is a diagram illustrating a driving waveform of the safety circuit of FIGS. 7 and 8 under an overcurrent nonoccurrence condition.

Referring to FIGS. 9 and 10, for a one frame time immediately after the system power is applied, a first test voltage of a gate low voltage VGL may be supplied to the first output terminal CTA of the clock supply circuit 135C, and a second test voltage of a gate high voltage VGH may be supplied to the second output terminal CTB.

Therefore, as in FIG. 9, when short circuit occurs between the first output terminal CTA and the second output terminal CTB, a defective current path (see FIG. 8) between the gate high voltage VGH and the gate low voltage VGL may be formed for a first time interval FT1 equal to a continuous one frame time. The first time interval FT1 may be longer than a one clock period of a first gate clock GCLKA or a second gate clock GCLKB. In other words, the first time interval FT1 may be longer than a one on clock period (or a one off clock period).

An OCP flag signal may be generated when a Q1 current flowing in a transistor Q1 is higher than an OCP level. According to the present embodiment, because a time for which a defective current path is formed due to short circuit is long by about a one frame time, the Q1 current flowing in the transistor Q1 may be easy to reach the OCP level. For the first time interval FT1, the OCP flag signal may be repeatedly generated whenever the Q1 current is higher than the OCP level. Furthermore, in FIG. 9, an increase or a decrease in the Q1 current may be repeated at a certain period, and this may be based on a PWM operation of the transistor Q1.

The overcurrent detector 180B may count an input of the OCP flag signal at the first time interval FT1 to increase the number of flag count signals FLAG_CNT. When the number of flag count signals FLAG_CNT is 64, the overcurrent detector 180B may generate an OCP shutdown signal OCP-SHDN. The flag count signal FLAG_CNT may be reset by the OCP shutdown signal OCP-SHDN, and the overcurrent detector 180B may self-restart.

The overcurrent detector 180B may perform a restart operation Restart_CNT three times, and then, may shut down the power generator 180A. When the power generator 180A is shut down, an output of the gate high voltage VGH from the power generator 180A may stop at a second time interval FT2, the first gate clock GCLKA and the second gate clock GCLKB may maintain a ground voltage GND. As a result, display driving may stop at the second time interval FT2.

Furthermore, as in FIG. 10, when short circuit does not occur between the first output terminal CTA and the second output terminal CTB, a defective current path (see FIG. 8) between the gate high voltage VGH and the gate low voltage VGL may not be formed. Therefore, the Q1 current may not reach the OCP level at the first time interval FT1, and the OCP flag signal may not be generated. In this case, the power generator 180A may not be shut down and may normally output the gate high voltage VGH at the second time interval FT2. As a result, the first pulse generated by the first pulse generator 135A may be output as the first gate clock GCLKA at the second time interval FT2, and the second pulse generated by the second pulse generator 135B may be output as the second gate clock GCLKB. Also, display driving may be performed based on the first gate clock GCLKA and the second gate clock GCLKB at the second time interval FT2.

Figure 11:
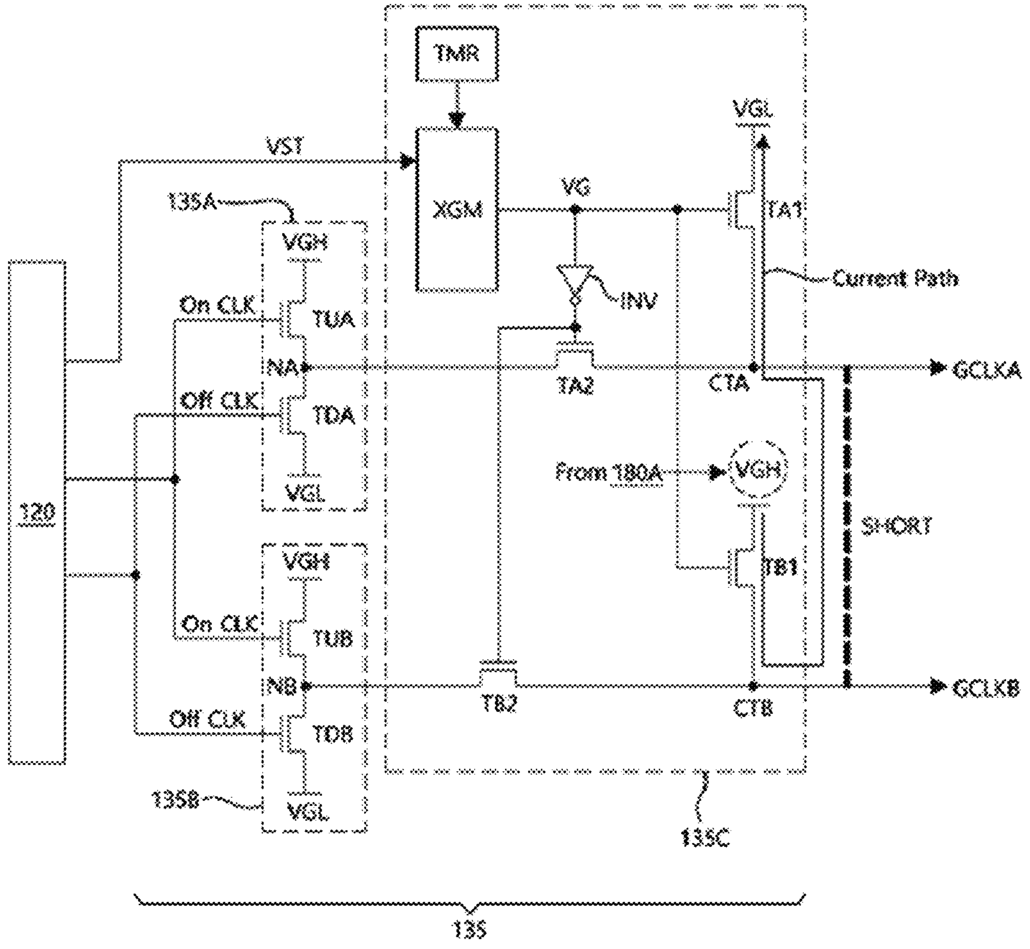
FIG. 11 is a diagram illustrating another circuit configuration of a level shifter included in the safety circuit of FIG. 6.
Figure 12:
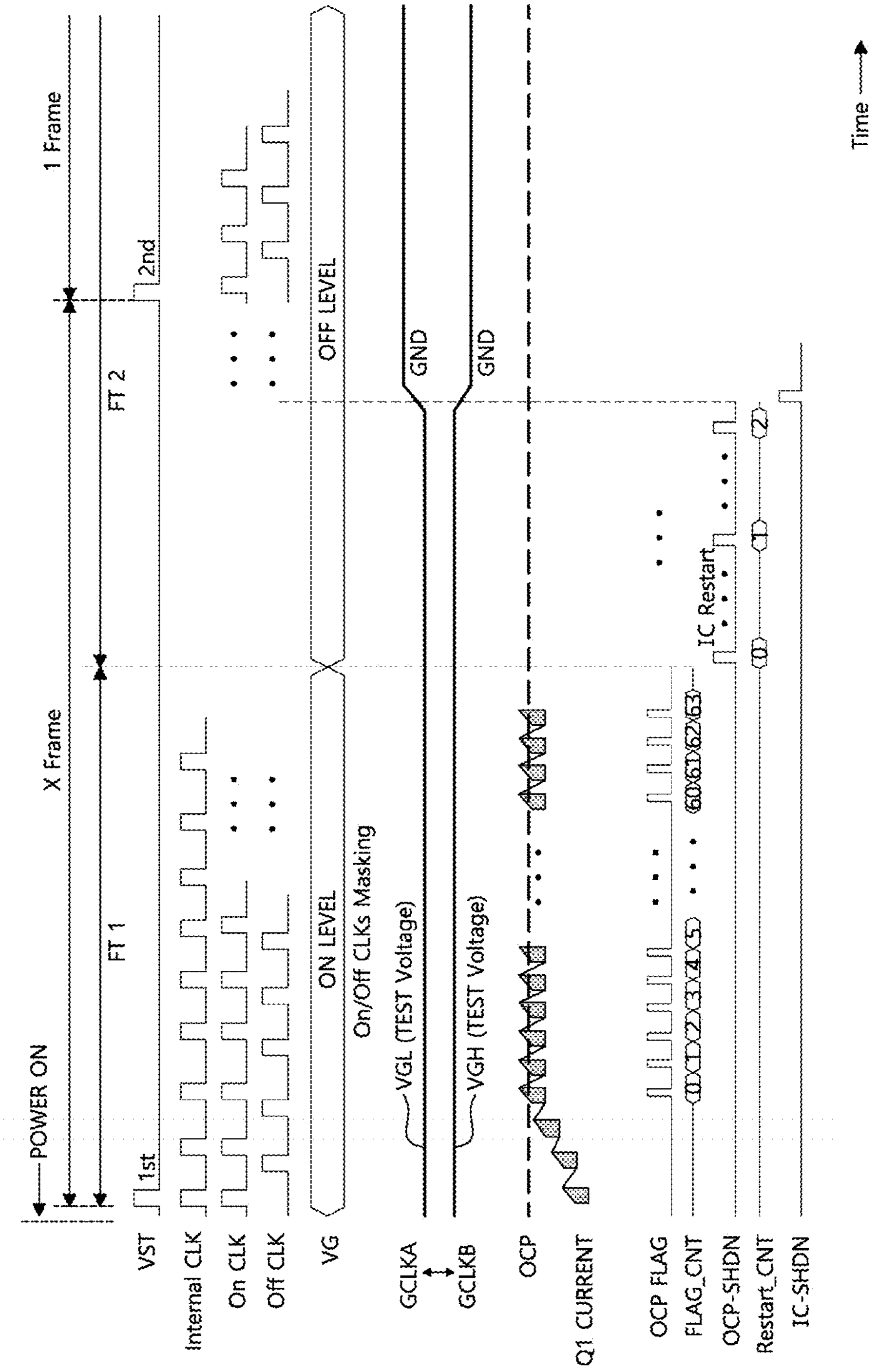
FIG. 12 is a diagram illustrating a driving waveform of the safety circuit of FIGS. 7 and 11 under an overcurrent occurrence condition.
Figure 13:
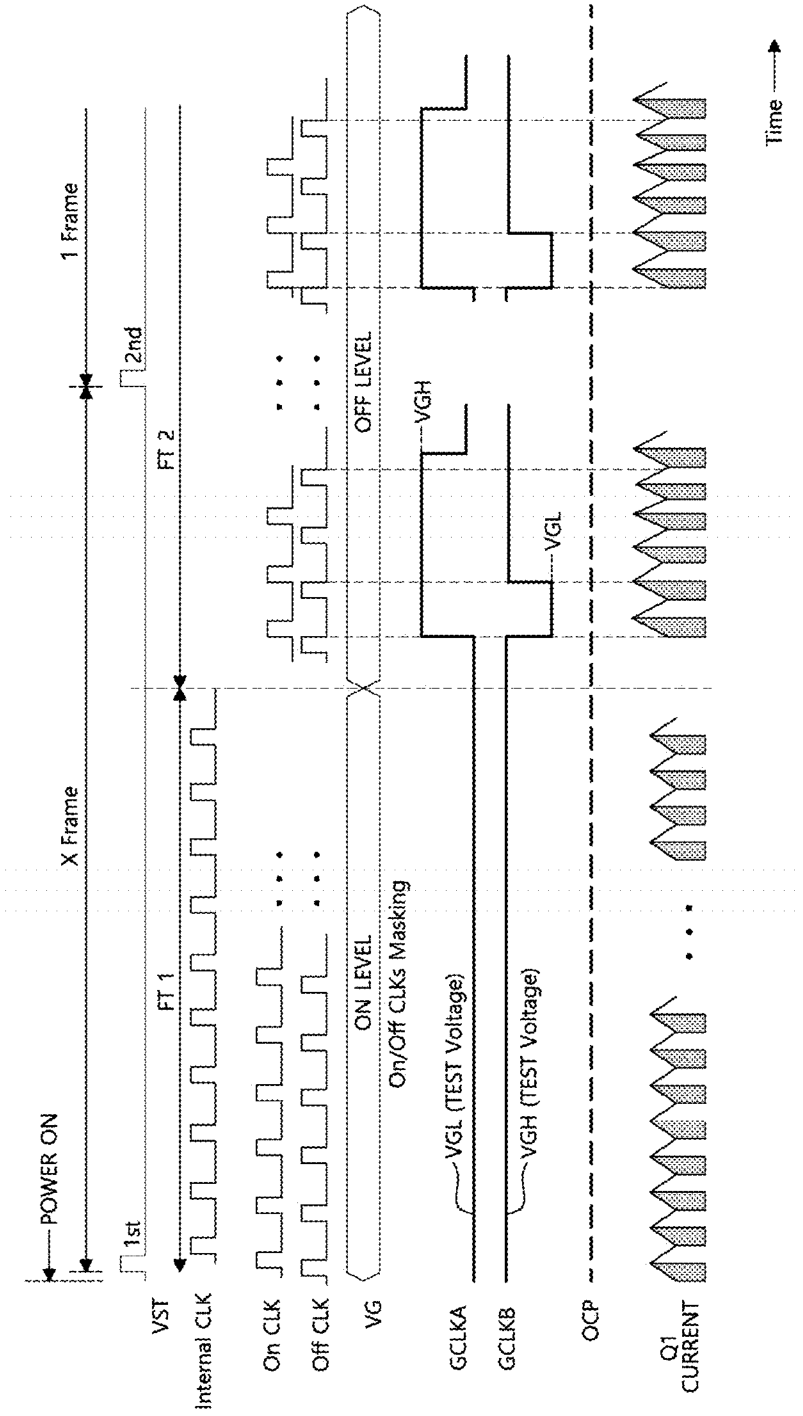
FIG. 13 is a diagram illustrating a driving waveform of the safety circuit of FIGS. 7 and 11 under an overcurrent nonoccurrence condition.

FIG. 11 is a diagram illustrating another circuit configuration of a level shifter included in the safety circuit XY of FIG. 6. FIG. 12 is a diagram illustrating a driving waveform of the safety circuit XY of FIGS. 7 and 11 under an overcurrent occurrence condition. FIG. 13 is a diagram illustrating a driving waveform of the safety circuit XY of FIGS. 7 and 11 under an overcurrent nonoccurrence condition.

In a configuration and an operation of a level shifter 135 of FIGS. 11 and 12, the level shifter 135 of FIGS. 11 and 12 may further include a first time adjuster TMR in a clock supply circuit 135C and thus may have a difference with FIG. 8, and the other configurations and operations may be substantially the same as FIG. 8.

In FIGS. 12 and 13, a time between a first pulse and a second pulse of a start signal VST may be defined as an X frame time, and a time between adjacent pulses subsequent to the second pulse may be defined as a one frame time. In this case, the X frame time may be a time which is shorter than the one frame time.

The first time adjuster TMR may generate first time information which is shorter than the X frame time and is longer than a one clock period of a first gate clock or a second gate clock, based on an internal clock (Internal CLK). The first time information may be supplied to a control voltage output circuit XGM for only a first time interval FT1 of the X frame time and may not be supplied to the control voltage output circuit XGM for a second time interval FT2, except the first time interval FT1, of the X frame time.

The control voltage output circuit XGM may output a gate control voltage VG having an on level for the first time interval FT1 which is reduced compared to the X frame time, based on the first time information and the start signal VST for defining the X frame time and may output the gate control voltage VG having an off level for the second time interval FT2 succeeding the first time interval FT1.

When a time for which the gate control voltage VG having an on level is applied is reduced as described above, a start timing of the second time interval FT2, for which normal driving is performed immediately after a system power is applied under an overcurrent nonoccurrence condition, may be earlier as in FIG. 13, and thus, comparing with FIG. 9, a time taken until a screen is normally turned on may be shortened and the convenience of a user may increase.

In the present embodiment, one of a gate high voltage and a gate low voltage may be supplied as a first test voltage to a first output terminal of a level shifter for an output of a first gate clock for a certain time (i.e., a relatively long period immediately after a system power is applied) before display driving, and the other of the gate high voltage and the gate low voltage may be supplied as a second test voltage to a second output terminal of a level shifter for an output of a second gate clock.

Accordingly, in the present embodiment, a long time for detecting overcurrent when the first output terminal and the second output terminal are short-circuited with each other may be secured, and thus, the accuracy of overcurrent detection may increase. In the present embodiment, because the accuracy of overcurrent detection increases, an abnormal operation of a display apparatus caused by the overcurrent may be prevented, thereby enhancing the reliability and stability of a display apparatus.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A display apparatus comprising:

a display panel configured to be driven based on a first gate clock and a second gate clock;

a first pulse generator configured to output a first pulse, swinging between a gate high voltage and a gate low voltage, to a first node on the basis of an on clock and an off clock;

a second pulse generator configured to output a second pulse, swinging between the gate high voltage and the gate low voltage, to a second node on the basis of the on clock and the off clock, a phase of the second pulse differing from a phase of the first pulse;

a clock supply circuit configured to include a first output terminal for an output of the first gate clock and a second output terminal for an output of the second gate clock, break an electrical connection between the first node and the first output terminal and an electrical connection between the second node and the second output terminal, output a first test voltage to the first output terminal, and output a second test voltage to the second output terminal, during a first time interval immediately after a system power is applied thereto, and stop the supply of the first test voltage to the first output terminal and the supply of the second test voltage to the second output terminal and electrically connect the first node to the first output terminal and the second node to the second output terminal for a second time interval after the first time interval;

a power generator configured to generate the gate high voltage and the gate low voltage and supply the gate high voltage and the gate low voltage to the first pulse generator, the second pulse generator, and the clock supply circuit; and an overcurrent detector configured to receive a flag signal to recognize overcurrent from the power generator to shut down the power generator, when the first output terminal and the second output terminal are short-circuited with each other at the first time interval, wherein the first test voltage output from the first output terminal during the first time interval is fixed to one of the gate high voltage of a first level and the gate low voltage of a second level lower than the first level, wherein the second test voltage output from the second output terminal during the first time interval is fixed to the other of the gate high voltage and the gate low voltage, and wherein the first time interval is between a first timing at which the system power is turned on and a second timing at which a display driving starts.

2. The display apparatus of claim 1, further comprising a gate shift register configured to generate a scan signal on the basis of a start signal, the first gate clock, and the second gate clock and supply the scan signal to gate lines of the display panel, wherein the first time interval is between a first pulse and a second pulse of the start signal counted from the first timing at which the system power is applied.

3. The display apparatus of claim 2, wherein the first time interval is a one frame time defined as an interval between the first pulse and the second pulse of the start signal.

4. The display apparatus of claim 2, wherein the first time interval is longer than a one clock period of the first gate clock or the second gate clock and is shorter than a time between the first pulse and the second pulse of the start signal.

5. The display apparatus of claim 4, wherein a time between the first pulse and the second pulse of the start signal is shorter than a time between adjacent pulses subsequent to the second pulse.

6. The display apparatus of claim 1, wherein, for the second time interval, the first pulse output through the first output terminal is the first gate clock, and the second pulse output through the second output terminal is the second gate clock.

7. The display apparatus of claim 1, wherein the clock supply circuit comprises:

a control voltage output circuit configured to output a gate control voltage with an on-level for the first time interval on the basis of a start signal for defining a one frame time;

a first control transistor turned on based on the gate control voltage with the on-level for the first time interval to supply the first test voltage to the first output terminal;

a second control transistor turned on based on the gate control voltage with the on-level for the first time interval to supply the second test voltage to the second output terminal;

an inverter configured to invert the gate control voltage with the on-level to a gate control voltage with an off-level for the first time interval;

a third control transistor turned off based on the gate control voltage with the off-level for the first time interval to break an electrical connection between the first node and the first output terminal; and a fourth control transistor turned off based on the gate control voltage with the off-level for the first time interval to break an electrical connection between the second node and the second output terminal.

8. The display apparatus of claim 7, wherein, for the second time interval, the control voltage output circuit outputs the gate control voltage with the off-level, the first control transistor and the second control transistor are turned off based on the gate control voltage with the off-level, the inverter inverts the gate control voltage with the off-level to the gate control voltage with the on-level, the third control transistor is turned on based on the gate control voltage with the on-level to electrically connect the first node to the first output terminal, and the fourth control transistor is turned on based on the gate control voltage with the on-level to electrically connect the second node to the second output terminal.

9. The display apparatus of claim 1, wherein, in the first time interval, the overcurrent detector continuously receives the flag signal first times and self-restarts, and then the overcurrent detector repeats a restart operation second times and shuts down the power generator.

10. The display apparatus of claim 9, wherein the first times are greater than the second times.

11. An overcurrent detection method of a display apparatus, the overcurrent detection method comprising:

generating a gate high voltage and a gate low voltage by using a power generator;

outputting a first pulse, swinging between a gate high voltage and a gate low voltage, to a first node on the basis of an on clock and an off clock by using a first pulse generator;

outputting a second pulse, swinging between the gate high voltage and the gate low voltage, to a second node on the basis of the on clock and the off clock by using a second pulse generator, a phase of the second pulse differing from a phase of the first pulse;

breaking an electrical connection between the first node and a first output terminal for an output of a first gate clock, and supplying a first test voltage to the first output terminal by using a clock supply circuit, during a first time interval immediately after a system power is applied;

breaking an electrical connection between the second node and a second output terminal for an output of a second gate clock, and supplying a second test voltage to the second output terminal by using the clock supply circuit, during the first time interval;

when the first output terminal and the second output terminal are short-circuited with each other at the first time interval, receiving a flag signal to recognize overcurrent from the power generator to shut down the power generator by using an overcurrent detector; and stopping the supply of the first test voltage to the first output terminal and the supply of the second test voltage to the second output terminal and electrically connecting the first node to the first output terminal and the second node to the second output terminal, by using the clock supply circuit, for a second time interval after the first time interval, wherein the first test voltage output from the first output terminal during the first time interval is fixed to one of the gate high voltage of a first level and the gate low voltage of a second level lower than the first level, wherein the second test voltage output from the second output terminal during the first time interval is fixed to the other of the gate high voltage and the gate low voltage, and wherein the first time interval is between a first timing at which the system power is turned on and a second timing at which a display driving starts.

12. The overcurrent detection method of claim 11, wherein the first time interval is between a first pulse and a second pulse of a start signal counted from the first timing at which the system power is applied, and the start signal defines a one frame time.

13. The overcurrent detection method of claim 12, wherein the first time interval is the one frame time defined as an interval between the first pulse and the second pulse of the start signal.

14. The overcurrent detection method of claim 12, wherein the first time interval is longer than a one clock period of the first gate lock or the second gate clock and is shorter than a time between the first pulse and the second pulse of the start signal.

15. The overcurrent detection method of claim 11, wherein receiving the flag signal to shut down the power generator comprises:

continuously receiving the flag signal first times and self-restarting in the first time interval by using the overcurrent detector; and then repeating a restart operation second times and shutting down the power generator in the first time interval by using the overcurrent detector.

* * * * *